(12) United States Patent
Sial et al.

(10) Patent No.: US 10,528,678 B2
(45) Date of Patent: Jan. 7, 2020

(54) DIGITAL CONTENT TRANSLATION TECHNIQUES AND SYSTEMS

(71) Applicant: Adobe Inc., San Jose, CA (US)

(72) Inventors: Ankur Sial, New Delhi (IN); Harpreet Neelu, Noida (IN); Amit Gupta, Greater Noida (IN); Akshay Madan, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/510,690

(22) Filed: Jul. 12, 2019

(65) Prior Publication Data

US 2019/0340247 A1    Nov. 7, 2019

Related U.S. Application Data

(63) Continuation of application No. 15/598,141, filed on May 17, 2017, now Pat. No. 10,372,830.

(51) Int. Cl.
*G06F 17/28* (2006.01)
*G06F 17/21* (2006.01)

(52) U.S. Cl.
CPC .......... *G06F 17/289* (2013.01); *G06F 17/211* (2013.01)

(58) Field of Classification Search
CPC .............................. G06F 17/289; G06F 17/211
USPC ........................................................... 704/2
See application file for complete search history.

(56) References Cited

U.S. PATENT DOCUMENTS

| | | | |
|---|---|---|---|
| 6,925,595 B1 * | 8/2005 | Whitledge | G06F 16/9577 715/234 |
| 7,685,159 B2 * | 3/2010 | Mitchell | G06F 16/34 707/726 |
| 7,752,202 B2 * | 7/2010 | Kobori | H04L 29/12594 707/736 |
| 8,887,214 B1 * | 11/2014 | Black | H04N 21/4227 725/90 |
| 10,372,830 B2 | 8/2019 | Sial et al. | |
| 2003/0101043 A1 * | 5/2003 | Boegelund | G06F 17/289 704/3 |
| 2003/0115552 A1 * | 6/2003 | Jahnke | G06F 9/454 715/201 |
| 2005/0038813 A1 * | 2/2005 | Apparao | G06F 16/48 |
| 2007/0180468 A1 * | 8/2007 | Gill | G06F 21/10 725/45 |
| 2008/0147661 A1 * | 6/2008 | Carden | G06F 17/212 |

(Continued)

OTHER PUBLICATIONS

"Notice of Allowance", U.S. Appl. No. 15/598,141, dated Mar. 22, 2019, 10 pages.

*Primary Examiner* — Edwin S Leland, III

(74) *Attorney, Agent, or Firm* — SBMC

(57) ABSTRACT

Digital content translation techniques and system are described. In one example, source digital content is linked via metadata to different derived format versions that are generated from the source digital content. The metadata, for instance, may be used to locate source digital content that generated a particular derived format version that is in use by a service provider system. The source digital content, once identified and located, may then be used to improve efficiency and accuracy in translation of text or images included as part of the source digital content. The updated source digital content is then used to generate a derived format version that includes the translated text or other portion, e.g., an image.

20 Claims, 7 Drawing Sheets

(56) References Cited

U.S. PATENT DOCUMENTS

| | | | | |
|---|---|---|---|---|
| 2011/0219451 A1* | 9/2011 | McDougal | G06F 21/562 | 726/23 |
| 2011/0296291 A1* | 12/2011 | Melkinov | G06F 17/211 | 715/229 |
| 2012/0297182 A1* | 11/2012 | Hawkins | H04L 9/088 | 713/150 |
| 2013/0275383 A1* | 10/2013 | McLarty | G06Q 10/107 | 707/663 |
| 2014/0157113 A1* | 6/2014 | Krishna | G06F 17/289 | 715/249 |
| 2014/0215303 A1* | 7/2014 | Grigorovitch | G06F 16/972 | 715/229 |
| 2014/0279324 A1* | 9/2014 | King | G06Q 30/04 | 705/34 |
| 2015/0199422 A1* | 7/2015 | Gaydaenko | G06F 17/2264 | 707/754 |
| 2015/0254350 A1* | 9/2015 | Lightner | G06F 16/9537 | 707/706 |
| 2016/0162478 A1* | 6/2016 | Blassin | G06Q 10/06311 | |
| 2016/0210195 A1* | 7/2016 | Sinha | G06F 16/178 | |
| 2016/0210202 A1* | 7/2016 | Sinha | G06F 16/00 | |
| 2016/0255139 A1* | 9/2016 | Rathod | G06F 16/9535 | 709/203 |
| 2017/0132186 A1* | 5/2017 | Plummer | G09C 1/00 | |
| 2017/0140219 A1* | 5/2017 | King | G06K 9/00483 | |
| 2018/0096203 A1* | 4/2018 | King | G06F 17/214 | |
| 2018/0143975 A1* | 5/2018 | Casal | G06F 17/2785 | |
| 2018/0189245 A1* | 7/2018 | Ghafourifar | H04L 9/3226 | |
| 2018/0336189 A1* | 11/2018 | Sial | G06F 17/211 | |
| 2019/0146773 A1* | 5/2019 | Attard | G06F 8/65 | 717/169 |
| 2019/0208014 A1* | 7/2019 | Goldberg | G06F 16/27 | |

* cited by examiner

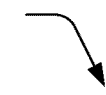

```
                    400 ─┐
                         ↘

┌──────────────────────────────────────────────┐
        │                      402                      │
        │ Receive a request to translate a derived      │
        │ format version of source digital content      │
        └──────────────────────────────────────────────┘
                              │
                              ▼
        ┌──────────────────────────────────────────────┐
        │                      404                      │
        │ Locate the source digital content based on    │
        │ metadata that is associated with the derived  │
        │ format version and is usable to identify the  │
        │ source digital content                        │
        └──────────────────────────────────────────────┘
                              │
                              ▼
        ┌──────────────────────────────────────────────┐
        │                      406                      │
        │     Extract text from the source digital      │
        │                    content                    │
        └──────────────────────────────────────────────┘
                              │
                              ▼
        ┌──────────────────────────────────────────────┐
        │                      408                      │
        │ Initiate generation of a translated version   │
        │ of the text from the source digital content   │
        └──────────────────────────────────────────────┘
                              │
                              ▼
        ┌──────────────────────────────────────────────┐
        │                      410                      │
        │ Update the derived format version as          │
        │ including the translated version of the text  │
        │                                               │
        │    ┌────────────────────────────────────┐     │
        │    │                412                  │    │
        │    │ Update the source digital content   │    │
        │    │   using the translated version of   │    │
        │    │              the text               │    │
        │    └────────────────────────────────────┘     │
        │                     │                         │
        │                     ▼                         │
        │    ┌────────────────────────────────────┐     │
        │    │                414                  │    │
        │    │  Generate the updated derived       │    │
        │    │  format version based on the        │    │
        │    │  updated source digital content     │    │
        │    └────────────────────────────────────┘     │
        └──────────────────────────────────────────────┘
```

602
Receive a request to cause translation of source digital content

604
Cause a portion of the source digital content to be translated

606
Identify a plurality of derived format versions for generation based on the source digital content, the identification based on metadata indicative of a link between the source digital content and the plurality of derived format versions

608
Generate a respective format of a plurality of different format types from the source digital content based on the translated portion

610
Cause communication of the plurality of different derived format versions, automatically and without user intervention, to respective service provider systems via a network that have obtained the respective format of the source digital content previously from the content provider system

*Fig. 6*

DIGITAL CONTENT TRANSLATION TECHNIQUES AND SYSTEMS

RELATED APPLICATIONS

This Application claims priority as a continuation of U.S. patent application Ser. No. 15/598,141, filed May 17, 2017, and titled "Digital Content Translation Techniques and Systems," the entire disclosure of which is hereby incorporated by reference.

BACKGROUND

Digital content creators may employ a variety of different formats in order to support output of digital content in a variety of different scenarios, such as for use in a webpage, mobile application, part of a presentation, for printing on a physical medium (e.g., publishing on paper), and so forth. To do so, digital content creators typically create source digital content through interaction with a content management system. The source digital content is then translated into a variety of different derived format versions to support output in these different usage scenarios.

A digital content creator, for instance, may first create the source digital content through interaction with a content management system that supports rich functionality usable to support display and further modification of the content, e.g., through use of layers as part of a Photoshop® Document (PSD) format. The content management system is then used to generate derived format versions to support output in different usage scenarios, such as to use a portable document format (PDF) or joint photographic experts group (JPEG) format for online use, a tagged image file format (TIFF) for publishing, and so forth. In this way, the different content format versions address storage and communication considerations of these scenarios as part of content consumption. The digital content versions are then disseminated to service provider systems for use, such as part of a webpage, for use in publishing, and so forth.

In some instances, the source digital content is also configured for multilingual use. However, the variety of different derived format versions may present a challenge for translation into different languages. A creative professional, for instance, may generate a banner as source digital content for a retail website through interaction with a content creation service. This source digital content is then used to generate derived format versions as previously described, which is then provided to a service provider system for dissemination to potential customers.

In order to support use of a different language, the service provider system may then wish to translate text included as part of the derived format version. However, in conventional techniques the service provider system typically does not have access to the source digital content nor a way or identifying the source digital content used to generate the derived format version. Consequently, the service provider system is typically forced to send the derived format version that is included as part of the retail website for translation, e.g., a derived format version as a JPEG. The text from the JPEG is then translated and embedded as part of the JPEG, which may result in noticeable artifacts, a diminished viewing experience, and is cumbersome to perform.

SUMMARY

Digital content translation techniques and system are described. In one example, source digital content is linked via metadata to different derived format versions that are generated from the source digital content. The metadata, for instance, may be used to locate source digital content that generated a particular derived format version that is in use by a service provider system.

The source digital content, once identified and located, may then be used to improve efficiency and accuracy in translation of text or images included as part of the source digital content. In one example, this is achieved by locating a text layer included as part of the source digital content to a translation service, which is then translated and provided back to update the source digital content, e.g., for support of a new language.

The updated source digital content is then used to generate a derived format version that includes the translated text. In this way, a unified system is supported having increased richness, computational efficiency, and accuracy in use of translations by providing a "clear view" of the text or image, supports copyright protection when limiting communication to the text layer (or relevant image layer) and not other layers of the source digital content, and so forth. Other examples are also contemplated as further described in the following sections, including automatic generation of derived format versions for dissemination (e.g., to service provider systems) in response to an update of the source digital content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 4 is a flow diagram depicting a procedure in an example implementation in which a derived format version is updated as including a translated version of text through use of source digital content.

FIG. 6 is a flow diagram depicting a procedure in an example implementation in which several different derived format versions are updated as including a translated portion through an update to source digital content.

DETAILED DESCRIPTION

Overview

Figure 1:
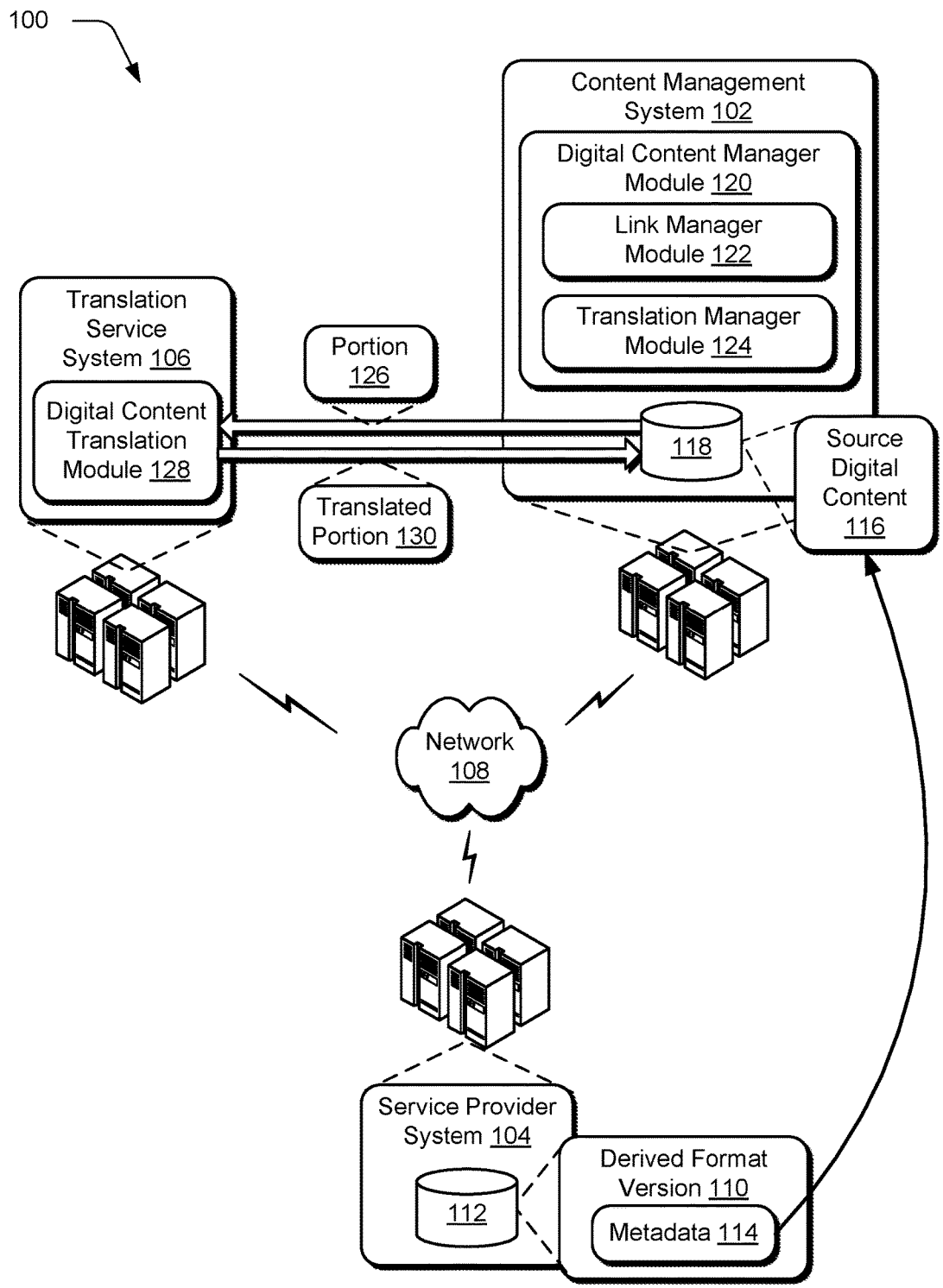
FIG. 1 is an illustration of an environment in an example implementation that is operable to employ translation linkage and metadata techniques described herein.

Digital content creators typically employ different formatted versions of source digital content in order to target different delivery mechanisms for dissemination to users, which are referred to as "derived format versions" in the following. To do so, the source digital content is created and edited in a rich format (e.g., PSD) through interaction with a computing device and then converted to other formats to address storage and delivery considerations, such as a JPEG for a webpage, TIFF for a printed publication, and so forth. This presents challenges regarding translation to service provider systems that receive a conventional derived format version of the source digital content but not the source digital content itself.

In one example, a webpage may be configured for output in a variety of different languages. Translation of the derived format version to support output in a different language in conventional techniques involves communication of the derived format version to a translation service system, e.g., a JPEG. The text from the JPEG is then translated and embedded as part of the JPEG, which may result in noticeable artifacts, a diminished viewing experience, and is cumbersome and computationally expensive to perform.

Accordingly, digital content translation techniques and system are described. In one example, metadata is generated (e.g., extracted if already present) by a content management system that supports a link between source digital content and derived format versions formed from the source digital content. The metadata, for instance, may be associated with the derived format version (e.g., as part of, maintained in a separate data repository, and so forth) that identifies the source digital content that is used to generate this version. Therefore, translations of text or digital images included as part of the derived format version may leverage identification and availability of the source digital content to increase accuracy in the translation, update an appearance of a derived format version that includes the translation (e.g., automatically and without user intervention), as well as support increased efficiency in network and computational resources.

A service provider system, for instance, may disseminate a webpage in multiple languages. To add a new language, metadata associated with the derived format version is used to locate source digital content, e.g., at a content management system. Text or an image to be translated is then extracted from the source digital content (e.g., a respective layer) and that text or image, without other portions of the source digital content, is then communicated to a translation service system. As a result, network communication efficiency and protection of potentially copyrighted material is increased.

The translation service system then translates the text or image. This may include output in a user interface and receive of user inputs to perform the translation, use of machine learning translation techniques that do not involve user inputs, or a combination thereof. The translation is then communicated back to the content management system, which is used to update the source digital content (e.g., to add additional layers for each language). This may include creation of a new version of the source digital content or appending the update as an additional layer, which may be used to improve storage efficiency of a computing device.

The updated source digital content is employed by the content management system to generate derived format versions (e.g., a JPEG, TIFF, etc.), a relevant one of which is then communicated to the service provider system. In this way, the translation has increased accuracy over conventional techniques that relied solely on the derived format version that is available. These techniques and systems also have increased computational and network efficiency through communication and utilization of relevant portions of the source digital content and not other portions (e.g., layers). Further discussion of these and other examples is contained in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a content management system 102, service provider system 104, and translation service system 106 that are communicatively coupled, one to another, via a network 108. Computing devices that implement the content management system 102, service provider system 104, and translation service system 106 may be configured in a variety of ways.

A computing device, for instance, may be configured as a desktop computer, a laptop computer, a mobile device (e.g., assuming a handheld configuration such as a tablet or mobile phone as illustrated), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as described in FIG. 7.

Figure 7:
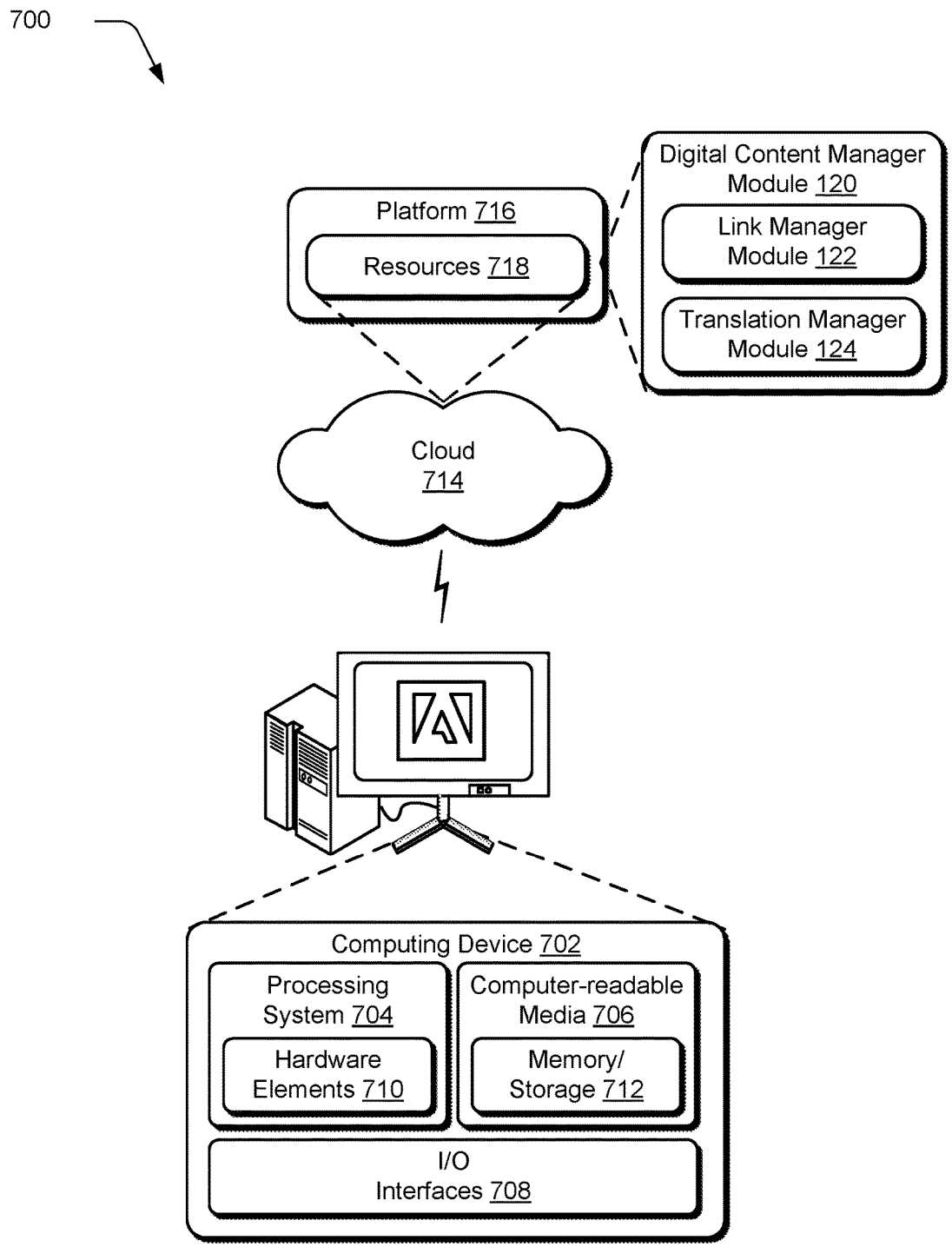
FIG. 7 illustrates an example system including various components of an example device that can be implemented as any type of computing device as described and/or utilize with reference to FIGS. 1-6 to implement embodiments of the techniques described herein.

In the illustrated example, the service provider system 104 is configured to disseminate a derived format version 110, which is illustrated as stored in a storage 112, e.g., memory or other computer-readable storage medium as described in greater detail in relation to FIG. 7 that may be implemented local or remote to the service provider system 104. The service provider system 104, for instance, may be configured to output a webpage that includes the derived format version 110, e.g., text as part of a banner, home page, and so forth. In order to translate the derived format version 110, the service provider system 104 leverages metadata 114 associated with the digital content version 110. The metadata 114 may be configured in a variety of ways to provide a link between the derived format version 110 and source digital content 116 used to generate that version. The metadata 114, for instance, may include a source content identifier that is usable to uniquely identify and locate the source digital content 116, which is illustrated as stored in a content repository 118 (e.g., storage device) of a content management system 102 accessible via a network 108.

The content management system 102 includes a digital content manager module 120 that is implemented by at least one computing device to manage creation, editing, and/or storage of digital content, an example of which is illustrated as the source digital content 116. Example of functionality of the digital content manager module 120 include a link manager module 122 and a translation manager module 124. The link manager module 122 is configured to generate and manage use of metadata 114 that provides a link between the source digital content 116 and derived format versions generated from the source. An example of generation of the metadata 114 by the link manager module 122 is described in greater detail in relation to FIG. 2.

Based on the linkage provided by the metadata 114, the link manager module 122 is configured to locate the source digital content 116 from the content repository. A translation manager module 124 is then used to extract a portion 126 of the source digital content 116 that is to be translated, e.g., text, an image, or other portion of digital content. In an implementation, the portion 126 and not other portions of the source digital content 116 are then communicated by the translation manager module 124 via the network 108 to a translation service system 106. For example, the translation manager module 124 may extract a text layer from the source digital content 116 as the portion 126 and communicate the text layer and not other layers of the source digital content 116 via the network 108. As a result, computational and network efficiency are increased as well as providing protection for the other layers that may be copyrighted.

The translation service system 106, upon receipt of the portion 126, employs a digital content translation module 128 that is configured to generate a translation of the portion 126. Generation of the translation may be performed in a variety of ways, such as through output in a user interface, automatically and without user intervention through machine learning or other computer translation techniques, and so forth. Regardless of how generated, the translated portion 130 is then communicated back to the content management system 102. Although the translation service system 106 and the content management system 102 are illustrated separately in this example, this functionality may be combined into a single entity (e.g., a single system), further divided across additional entities, and so forth.

The digital content manager module 120, upon receipt of the translated portion 130 by the translation manager module 124, updates the source digital content 116 with the translated portion 130, e.g., changes a layer or appends another layer to the source digital content 116. The updated source digital content 116 is then used to generate derived format versions 110 as indicated by the metadata 114, which may then be communicated to the service provider system 104 for dissemination. In this way, the updated source digital content 116 may be used to generate the derived format version 110 to include the translated portion 130 in an accurate manner and thus avoid limitations of conventional techniques that rely on the derived format version 110. Further discussion of translation is described in the following in relation to FIGS. 3-4 and generation of derived format version is descried in the following in relation to FIGS. 5-6, which may be performed automatically and without intervention in response to an update to the source digital content.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Metadata Link Generation

Figure 2:
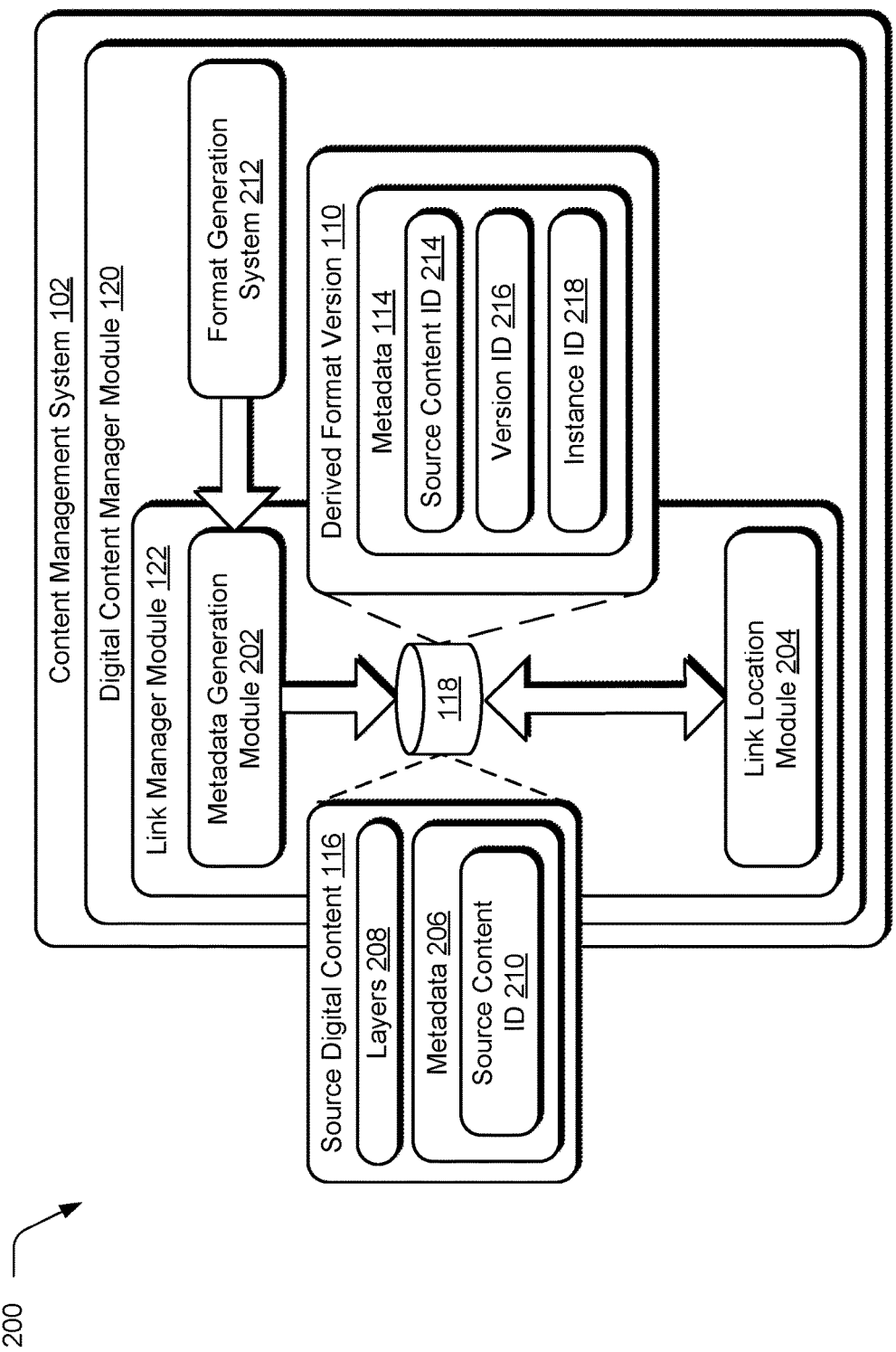
FIG. 2 depicts a system in an example implementation showing generation and management of metadata to link source digital content with a derived format version derived from the source digital content.

FIG. 2 depicts a system 200 in an example implementation showing generation and management of metadata to link source digital content 116 with a derived format version 110 derived from the source digital content 116. The link manager module 122 of the content management system 102 is shown in greater detail as including a metadata generation module 202 (e.g., to create or extract metadata) and a link location module 204. The metadata generation module 202 is implemented at least partially in hardware of a computing device to generate metadata 114 associated with the derived format version 110 and metadata 206 associated with source digital content 116.

The metadata generation module 202, for instance, may receive source digital content 116 that includes layers 208 in this example, e.g., text and image layers as found in a PSD formatted file. The metadata generation module 202 then generates a source content ID 210 (e.g., created or extracted) as part of the metadata 206 that is usable to identify and/or locate the source digital content 116, e.g., in a local or remote content repository 118. The metadata 206, for instance, may be extracted if already available or created if not already available. In one example, metadata 206 is generated "outside", e.g., when creating a PSD file having source metadata, generation of a JPEG from this file includes metadata derived from the source metadata. The metadata 206 is illustrated as stored with the source digital content 116 in this example, although other examples are also contemplated, e.g., as part of a data collection for several different items of source digital content together but that does not actually include the source digital content 116.

Likewise, the metadata generation module 202 is also configured to generate metadata 114 for a derived format version 110 generated from the source digital content 116, e.g., extracted or created as described above. For example, a format generation system 212 may be included as part of the digital content manager module 120 to generate the derived format version 110 from the source digital content 116, such as to generate a JPEG, TIFF, or other format from a PSD file. As part of generating the derived format version 110, metadata from the source digital content 116 may be used to derive metadata for the derived format version 110.

As part of doing so, the metadata generation module 202 generates metadata 114 that includes a source content ID 214 that corresponds to the source digital content 116, a version ID 216 that identifies a version of the document (e.g., which may be generated/regenerated while copying to a new file path or converted to a new format using "save as"), and an instance ID 218 that is usable as part of an editing history, e.g., generated after selection of "save changes." A variety of other examples of metadata 114 are also contemplated, such as a network address via which the source digital content 116 is available, e.g., of the content management system 102.

The link location module 204 is then usable to locate a link between source digital content 116 and derived format version 110. In one example, this is used to locate source digital content 116 to derive an updated translation of the derived format version 110 as further described in relation to FIGS. 3 and 4. In another example, this is used to automatically generate derived format versions in response to an update of the source digital content 116 as further described in relation to FIGS. 5 and 6.

The metadata generation module 202 may support generation of metadata in a variety of different scenarios, such as to extract metadata automatically and without user intervention by leveraging defined relations between source and derived format versions 110. In a first such scenario, the metadata 114 is generated automatically and without user intervention when a derived format version 110 is added to the content repository 118 after the source digital content 116. XMP metadata, for instance, refers to extensible metadata platform metadata, which is an ISO standard for creation, processing, and interchange of standardized and custom metadata for digital documents and data sets. As a part of XMP metadata, a "xmpMM:DerivedFrom" property may be used to store unique IDs of the source digital content 116 from which the derived format version 110 is derived as a source content ID 214. The source content ID 214 "xmpMM:OriginalDocumentID" is used to uniquely identify the source digital content 116 as a conceptual entity and is generated when the source digital content 116 is created. A version ID 216 "xmpM:DocumentID" is used to identify a version of the derived format version 110 and is generated when copying the version to a new file path or conversion to a new format using "save as" by the format generation system 212. The instance ID 218 "xmpMM:InstanceID" is used to support an editing history and is generated after changes are saved to the derived format version 110. For example, the derived format version 110 generated as a JPEG from the source digital content 116 may include metadata 115 having the following values:

<xmpMM:DerivedFrom stRef:instanceID=
"smp.iid: 5D7AEA4C33F3E12A645DCB492B259708"
stRef: documentID=
"XMP.did:A03F157C0672B72A847BF5CFD70B5F05"
stRef: originalDocumentID=
"xmp.did:0F7860F72EFCECF302C904E31F366384"/>

Therefore, for a given derived format version 110, corresponding source digital content 116 may be located by the link location module 204 through use of the metadata 114. The source digital content 116 is related automatically and without user intervention when the source content IDs 210, 214 match, one to another, e.g.,"<xmpMM:DerivedFrom-stRef:instanceID="xmp.iid:5D7AEA4C33F3E12A6 45DCB493B259708" stRef: documentID="xmp.did: 03F157C0672B72A847BF5CF D70B5F05" stRef: originalDocumentID="xmp.did: 0F7860F72EFCECF302C904E3 1F366384"/>." If the IDs do not match, a user verification is requested. Thus, in this instance the metadata is stored within the content repository 118.

In an instance in which the metadata is maintained on a service provider system 104 that is used to upload the source digital content 116 and/or the derived format version 110, a search may be used by the service provider system 104 to locate the source digital content 116. Thus, in this example at least part of the functionality of the link manager module 122 is included on the service provider system 104. In an example in which the metadata 206 and/or source digital content 116 and derived format version 110 are maintained on a third-party service (e.g., Dropbox®, Box®, Google® Drive), a network address (e.g., URL) of the service may be included.

In another example in which the source digital content 116 is added to the content repository 118 after the derived format version 110, the metadata 206, 114 from the source digital content 116 and derived format version 110 is extracted. The metadata 206, 114 is then saved as an XMP metadata property in the content repository 118 to locate the source digital content 116 and/or the derived format version 110. In a further example, manual linking may be performed in which user inputs are used as a basis by the metadata generation module 202 to generate the metadata 206, 114.

In one instance, the source digital content 116 includes several different text or image layers, each corresponding to a respective translation, e.g., language type. In such an instance, the layers may follow a naming convention, e.g., "<language-code>-<country-code>_<layer-name>" or "<language-code>_<layer-name>" where:

<language-code> is ISO0639 standardized two or three letter language code;
<country-code> is ISO 3166 standardized two or three letter country code; and
<layer-name> is a unique identifier for each layer in a given language, this identifier may be used to generate and synchronize multiple lingual layers.

The following includes examples of use of this convention:
1. Layer name; background; Description: background (image) layer that is consistent for each language;
2. Layer name; en_title; Description: Title in English language;
3. Layer name; fr_title; Description: Title in French language;
4. Layer name; en_us_description; Description: Description in English language for United States; and
5. Layer name: en_au_description; Description: Description in English language for Australia.

During generation of a language specific version of the derived format version 110 from the source digital content 116, each of the layers corresponding to textual content of a particular language are visible, and the rest of the text layers are hidden. In a scenario involving human translation, an image or other content may be provided, e.g., an image for which a globalization equivalent is to be found. Any layer which does not follow the language layer nomenclature may or may not be shown. For example, for generating a French derived format version, the layer with name "fr_title" is shown where the layer with name "en_title" is hidden. Also, the layer with name "background" is shown.

The metadata 206, 114, as previously described, may then be used to support location of source digital content to aid in translation, further discussion of which is included in the following section and shown in a corresponding figure.

Digital Content Translation

Figure 3:
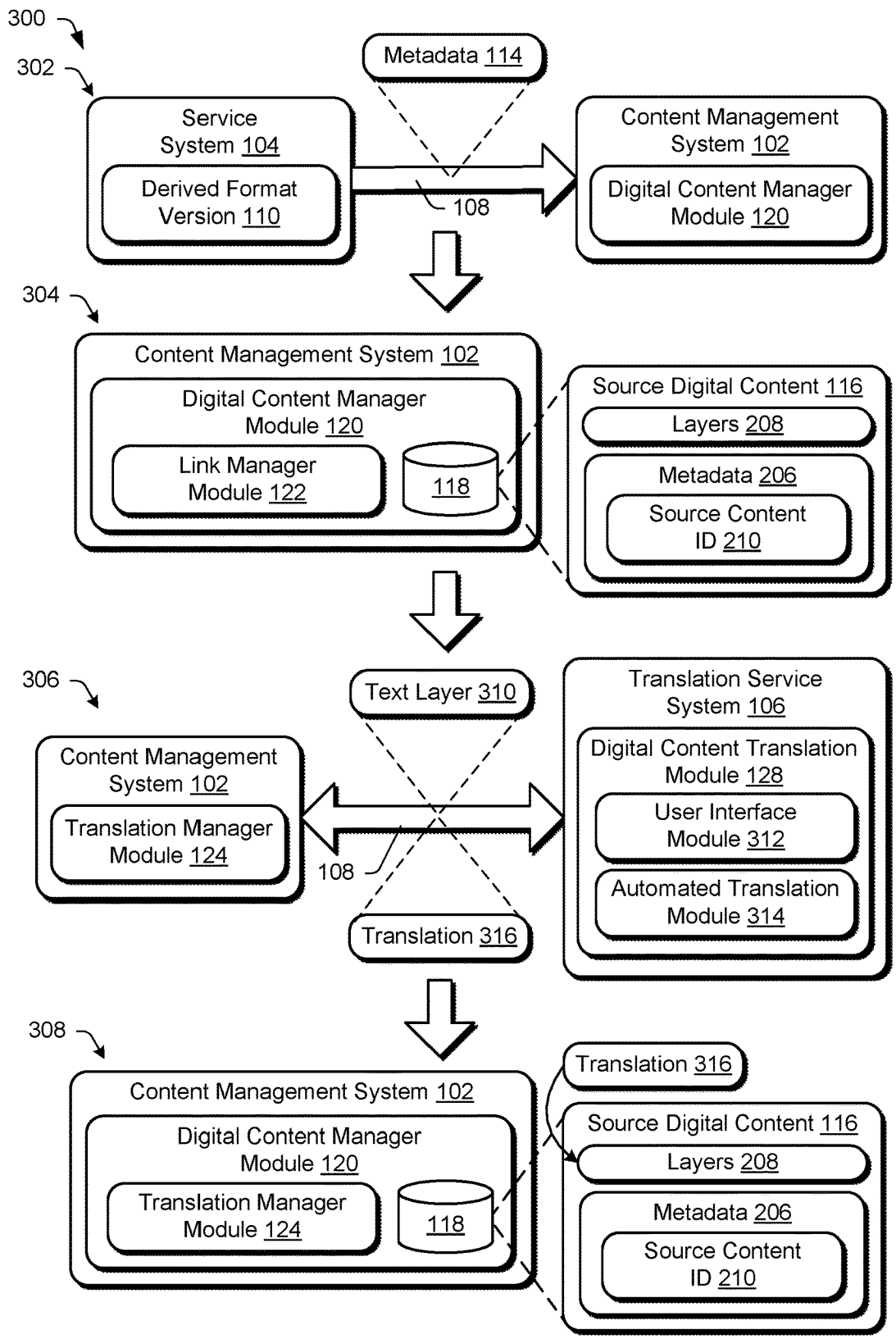
FIG. 3 depicts a system in an example implementation in which a translation is generated to update source digital content.

FIG. 3 depicts a system 300 in an example implementation in which a translation is generated to update source digital content and a derived format version. FIG. 3 is depicted using first, second, third, and fourth stages 302, 304, 306, 308. FIG. 4 depicts a procedure 400 in an example implementation in which a derived format version is updated as including a translated version of text, image, and so forth through use of source digital content.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-4.

To begin, a request is received at the first stage 302 to translate a derived format version 110 of source digital content 116 (block 402). The request, for instance, may include metadata 114 that is taken from the derived format version 110 and communicated to the content management system 102 via the network 108. The metadata 114 may include an identification of the content management system 102 (e.g., a network address) as well as a source content ID 214.

At the second stage 304, the source digital content 116 is located by the link manager module 122 of the content management system 102 based on metadata 114 that is associated with the derived format version 110 and is usable to identify the source digital content (block 404). The link manager module 122, for instance, may locate a source content ID 210 in metadata 206 of the source digital content 116 in the content repository 118 that corresponds to the source content ID 214, e.g., through use of an index.

Once located, text or other portion of the source digital content 116 is extracted from the source digital content (block 406) by the translation manager module 124. As shown at the third stage 306, for instance, the translation manager module 124 of the content management system 102 extracts a text layer 310 from the layers 208 of source digital content 116. Generation of a translation (i.e., a translated version of the text) is initiated from the source digital content (block 408). To do so, the text layer 310 (and not other layers 208 of the source digital content 116) is communicated via the network 108 to a translation service system 106. In this way, the translation service system 106 is provided with "clean" version of the text or other portion to be translated, as opposed to conventional techniques that relied on communication of the derived format version 110 itself. This also serves to increase network and computational resource efficiency by lowering an amount of data communicated to and processed by the translation service system 106.

The translation service system 106 then employs a digital content translation module 128 to translate the text layer 310 or other portion of the source digital content 116, e.g., an image. In one example, a user interface module 312 is used to output a user interface that includes the text layer 310 and receive user inputs to translate text. In another example, an automated translation module 314 is configured to generate the translation 316 of the text of the text layer 310 automatically and without user intervention, e.g., through machine learning as employed by a neural network of at least one computing device. The translation 316, however generated, is then provided back to the content management system 102 by the translation service system 106 via the network 108 in the illustrated example.

At the fourth stage 308, the derived format version is updated as including the translated version of the text (block 410). For example, the source digital content is updated using the translation 316, e.g., the translated version of the text (block 412). The updated derived format version is then generated based on the updated source digital content (block 414), e.g., through use of a format generation system 212. For instance, a respective layer 208 of the source digital content 116 is then updated using the translation, e.g., the text layer 310 replaces an existing layer or is appended as an additional layer. Once updated, the derived format version 110 is updated (e.g., generated again) using the source digital content 116, such as to create a JPEG, TIFF, and so forth. In this way, an accurate and "clean" (i.e., free from artifact) derived format version 110 may be generated with increased network and computational efficiency over conventional techniques that relied solely on the derived format version. Generation of the derived format version 110 may also be performed automatically and without user intervention in response to an update of the source digital content 116, an example of which is described in the following section and shown in corresponding figures.

Automatic Derived Format Generation

Figure 5:
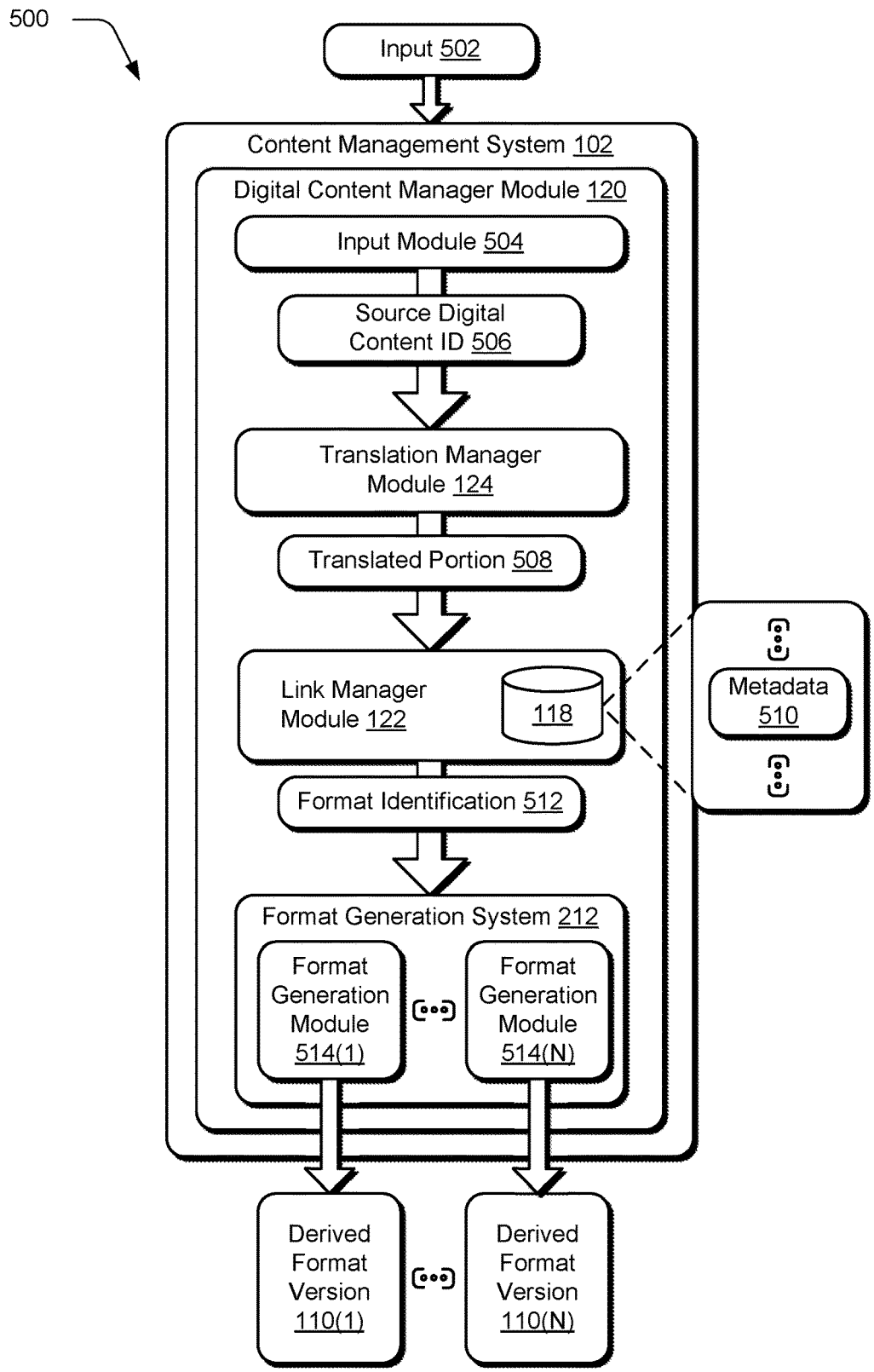
FIG. 5 depicts a system in an example implementation in which derived format versions are automatically generated based on an update to source digital content.

FIG. 5 depicts a system 500 in an example implementation in which derived format versions are automatically generated based on an update to source digital content. FIG. 6 depicts a procedure 600 in an example implementation in which a several different derived format versions are updated as including a translated portion through an update to source digital content.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 2, 5 and 6.

As before a request is received to cause translation, which in this instance is to cause translation of source digital content (block 602). An input 502, for instance, may be received by an input module 504 of the content management system 102. The input 502 may include a request to translate a derived format version 110 or the source digital content 116 itself. For instance, as described in the previous section a request to translate a derived format version 110 may cause translation of source digital content 116. In another instance, the input 502 specifies translation of the source digital content directly. Thus, in either instance a source digital content ID 506 may be obtained to locate the source digital content 116.

A portion of the source digital content is caused to be translated (block 604). The translation manager module 124, for instance, may extract a portion (e.g., a text layer, image layer, and so forth) from the source digital content 116. The portion is then provided to a translation service system 106 as previously described to obtain the translated portion 508. The translated portion 508 is then used to update the source digital content 116. In another example, functionality of the translation service system 106 is employed locally by the translation manager module 124 to update the source digital content 116.

A plurality of derived format versions are identified for generation based on the source digital content. The identification is based on metadata indicative of a link between the source digital content and the plurality of derived format versions (block 606). In this instance, the link manager module 122 examines metadata 510 included in the content repository that indicates a link between the source digital content 116 and corresponding derived format versions 110. As a result, a format identification 512 is obtained that identifies which formats have been generated and used by service provider system 104 from the content management system 102. In another instance, each available derived format version is generated automatically and without user intervention.

A respective format of the plurality of different format types are generated from the source digital content based on the translated portion (block 608). The format generation system 212, for instance, may include several different format generation modules 514(1)-514(N), each corresponding to a different format type, e.g., JPEG, TIFF, and so forth. These several different format generation modules 514(1)-514(N) are used to generate a corresponding derived format version 110(1)-110(N) from the updated source digital content 116. In one example, this is performed automatically and without user intervention in response to detection of the update to the source digital content 116.

Communication is then caused of the plurality of different derived format versions, automatically and without user intervention, to respective service provider systems via a network that have obtained the respective format of the source digital content previously from the content provider system (block 610). The content management system 102, for instance, may utilize the metadata 510 to locate which service provider systems 104 have obtained respective derived format versions 110(1)-110(N) from the source digital content 116. The content management system 102 may then communicate a notification of availability of the updated derived format versions 110(1)-110(N) and/or the derived format versions 110(1)-110(N), itself. In this way, the update to the source digital content 116 triggers the update to the derived format versions 110(1)-110(N). A variety of other examples are also contemplated.

Example System and Device

FIG. 7 illustrates an example system generally at 700 that includes an example computing device 702 that is representative of one or more computing systems and/or devices that may implement the various techniques described herein. This is illustrated through inclusion of the digital content manager module 120, link manager module 122, and translation manager module 124. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to automatically update a plurality of derived format versions, a method implemented by a computing device, the method comprising:
   detecting, by the computing device, an update to a source digital content as a translated portion of the source digital content;
   updating, by the computing device, the source digital content by adding a layer to the source digital content;
   locating, by the computing device, service provider systems that have obtained respective versions of the plurality of derived format versions from the source digital content, the locating utilizing metadata;
   generating, by the computing device, a plurality of updated derived format versions; and
   communicating, by the computing device, the plurality of updated derived format versions to the service provider systems for dissemination.

2. The method as described in claim 1, wherein the plurality of updated derived format versions do not include the source digital content.

3. The method as described in claim 1, wherein the source digital content includes at least one text layer.

4. The method as described in claim 1, wherein the source digital content includes at least one image layer.

5. The method as described in claim 1, wherein the metadata is maintained on a service provide system of the service provider systems.

6. The method as described in claim 1, wherein the updating is performed automatically and without user intervention in response to the detecting.

7. The method as described in claim 1, wherein the metadata links a source content identifier that identifies the source digital content to version identifiers that identify the plurality of derived format versions.

8. In a digital medium environment to automatically link a source digital content added to a content repository after a derived format version, a method implemented by a computing device, the method comprising:
   adding, by the computing device, the source digital content to the content repository;
   extracting, by the computing device, metadata from the source digital content, the metadata including a source content identification;
   searching, by the computing device, the content repository for a matching source content identification;
   identifying, by the computing device, the matching source content identification as part of metadata of the derived format version; and
   linking, automatically by the computing device, the source digital content and the derived format version, the linking indicating that the derived format version is derived from the source digital content.

9. The method as described in claim 8, wherein the source digital content includes at least one text layer.

10. The method as described in claim 8, wherein the source digital content includes at least one image layer.

11. The method as described in claim 8, wherein the extracted metadata is saved as an XMP metadata property in the content repository.

12. The method as described in claim 8, wherein the derived format version and the source digital content have different file formats.

13. The method as described in claim 8, further comprising:
   generating an additional derived format version using the source digital content; and
   automatically linking the additional derived format version and the source digital content.

14. In a digital medium environment to automatically link a derived format version of a source digital content, the derived format version added to a content repository after the source digital content, a method implemented by a computing device, the method comprising:
   adding, by the computing device, the derived format version to the content repository;
   extracting, by the computing device, metadata from the derived content version, the metadata including a source content identification;
   searching, by the computing device, the content repository for a matching source content identification; and
   identifying, by the computing device, the matching source content identification as part of metadata of the source digital content; and
   linking, automatically by the computing device, the derived format version and the source digital content, the linking indicating that the derived format version is derived from the source digital content.

15. The method as described in claim 14, wherein the derived format version and the source digital content have different file formats.

16. The method as described in claim 14, wherein the source digital content includes at least one text layer.

17. The method as described in claim 14, wherein the source digital content includes at least one image layer.

18. The method as described in claim 14, further comprising:
   generating an additional derived format version using the source digital content; and
   automatically linking the additional derived format version and the source digital content.

19. The method as described in claim 14, wherein the metadata of the source digital content is saved as an XMP metadata property in the content repository.

20. The method as described in claim 14, wherein the derived format version includes a translated portion of the source digital content.

\* \* \* \* \*